Feb. 9, 1960 J. W. F. SMITH 2,924,753
ELECTRICAL PROTECTIVE RELAY SYSTEMS
Filed May 14, 1956 3 Sheets-Sheet 1

(A)

(B)

(C)

United States Patent Office 2,924,753
Patented Feb. 9, 1960

2,924,753

ELECTRICAL PROTECTIVE RELAY SYSTEMS

John Walter Freeman Smith, Stafford, England, assignor to The English Electric Company Limited, London, England, a British company Application May 14, 1956, Serial No. 584,698

Claims priority, application Great Britain June 17, 1955

9 Claims. (Cl. 317—36)

This invention relates to electrical protective relay systems of a kind in which relay operation is governed by a transductor.

It is an object of the invention to provide an improvement on a basic form of impedance relay proposed by Dahlgren (Patent No. 2,573,249). In this form of relay the main magnetising winding of the transductor is connected in parallel with the operating coil of an electromagnetic switch and the parallel arrangement thus formed is connected in series with the secondary winding of a current transformer energised in proportion to the current in a protected line. The control winding of the transductor is energised by a rectified voltage signal derived from a voltage transformer energised from the protected line. In operation, the transductor saturates at a value of line voltage which depends, owing to the inherent characteristics of the transductor, partly upon the current flowing through its main winding. If the transductor is saturated the impedance of this main winding is very small and, consequently, little current flows in the operating coil of the electro-magnietic switch. However, as soon as the line voltage falls sufficiently to render the transductor unsaturated the impedance of the main transductor winding suddenly rises with the result that current is diverted from this winding to the operating coil of the switch. Thus, relay operation occurs as soon as the transductor changes from a saturated to an unsaturated state. The impedance characteristic arises because the threshold of saturation depends to some extent upon the current in the transductor main winding and the greater this current, the greater the control voltage signal required at this threshold. The operation of this relay to obtain a good impedance characteristic is therefore very much dependent upon the transductor characteristics and does not lend itself to accurate operation without careful design and calibration.

The improvement provided by this invention arises from a relative independence of the inherent characteristic of transductor operation. Two advantages arising from the use of the invention are that a highly accurate impedance relay can be obtained with a relatively simple circuit arrangement and, if necessary, the avoidance of a need to rectify the voltage signal derived from the protected circuit before this is applied to control the transductor.

A relay system according to this invention utilises a transductor which at the threshold of relay operation has a state of magnetization removed from the knee of the magnetization curve, which is the point of the curve which may be regarded as representing the threshold between the unsaturated and saturated condition. The relay system of this invention does not operate as the transductor changes from a state of saturation to a state of unsaturation; over the whole working range of the relay the transductor core is saturated. In addition to this, one aspect of this invention provides that the core of the transductor itself shall include an armature. This eliminates the need for a coil-operated switch of the kind suggested by Dahlgren.

According to one aspect of the invention, an electrical protective relay system of the kind utilising the saturation characteristics of a transductor device to obtain an impedance-type characteristic comprises in combination, a protected alternating current circuit, a voltage transformer connected to be energized by said circuit, a current transformer connected to be energized by said circuit, a transductor device having a saturable core, a relay contact system including means for operating it to perform a protective function in sole response to the magnetic flux in said core, an energizing winding on said core connected to be energized by said current transformer to produce a magneto-motive force in the core which increases the relay operating effect of the magnetic flux in said core as the current in the protected circuit increases, and a control winding on said core connected to be energized by said voltage transformer to control the degree of core saturation and thereby increase the relay operating effect of said magneto-motive force as the voltage of the protected circuit decreases, said relay contact system being so set that over its normal working range the transductor core is so strongly saturated by said control winding that at the threshold of relay operation the core is magnetized beyond the knee of the magnetization curve of the core material.

According to another aspect of the invention an electrical protective relay system of the kind utilising the saturation characteristics of a transductor device to obtain an impedance-type characteristic comprises, in combination, a protected alternating current circuit, a voltage transformer connected to be energized by said circuit, a current transformer connected to be energized by said circuit, a saturable transformer having a saturable core, a secondary winding on said core, a coil-operated relay contact system connected to be energized by an output signal supplied by said secondary winding and connected in said circuit to perform a protective function when operated, a primary energizing winding on said core connected to be energized by said current transformer to produce a magneto-motive force in the core which increases the output signal from the secondary winding as the current in the protected circuit increases, and a control winding on said core connected to be energized by said voltage transformer to control the degree of core saturation and thereby increase the output signal from the secondary winding as the voltage of the protected circuit decreases, said relay contact system being so set that over its normal working range the transductor core is so strongly saturated by said control winding that at the threshold of relay operation the core is magnetized beyond the knee of the magnetization curve of the core material.

According to still another aspect of the invention an electrical protective relay system of the kind utilising the saturation characteristics of a transductor device to obtain an impedance-type characteristic comprises, in combination, a protected alternating current circuit, a voltage transformer connected to be energized by said circuit, a current transformer connected to be energized by said circuit, a saturable transformer having a saturable core, a secondary winding on said core, a coil-operated relay contact system connected to be energized by an output signal supplied by said secondary winding and connected in said circuit to perform a protective function when operated, a primary energizing winding on said core loosely-coupled magnetically with said secondary winding and connected to be energized by said current transformer to have a potential drop proportional to the current in said alternating current circuit to induce a rate of flux change in the part of the core embraced by the primary winding which increases the output signal from the secondary winding as the current in the protected circuit increases, and a control winding on said core connected to be energized by said voltage transformer to control the degree of core saturation and thereby strengthen the magnetic coupling between the primary and secondary windings and increase the output signal from the secondary winding and so enhance the relay operating effect as the voltage of the protected circuit decreases, said relay contact system being so set that over its normal working range the transductor core is so strongly saturated by said control winding that at the threshold of relay operation the core is magnetized beyond the knee of the magnetization curve of the core material.

According to yet another aspect of the invention an electrical protective relay system of the kind utilising the saturation characteristics of a transductor device to obtain an impedance-type characteristic comprises, in combination, a protected alternating current circuit, a voltage transformer connected to be energized by said circuit, a current transformer connected to be energized by said circuit, a saturable transformer having a four-limbed saturable magnetic core comprising two independent flux paths, each including an outer and an inner limb, and a single flux path including the centre two limbs of the core, a secondary winding on said core connected to be energized by the combined flux in both independent flux paths, a coil-operated relay contact system connected to be energized by an output signal supplied by said secondary winding and connected in said circuit to perform a protective function when operated, a primary energizing winding on said core, magnetically coupled to the secondary winding and connected to be energized by said current transformer to produce a magnetic effect around said two independent flux paths in the core and thereby increase the output signal from the secondary winding and so enhance the relay operating effect as the current in the protected circuit increases, and a control winding on the centre two limbs of said core connected to be energized by said voltage transformer to control the degree of core saturation around said single flux path and thereby increase the relay operating effect of said output signal from the secondary winding as the voltage of the protected circuit decreases, said relay contact system being so set that over its normal working range the transductor core is so strongly saturated by said control winding that at the threshold of relay operation the core is magnetized beyond the knee of the magnetization curve of the core material.

According to another aspect of the invention an electrical protective relay system of the kind utilising the saturation characteristics of a transductor device to obtain an impedance-type characteristic comprises, in combination, a protected alternating current circuit, a voltage transformer connected to be energized by said circuit, a current transformer connected to be energized by said circuit, a transductor device having a saturable core including an armature, a relay contact system operated by said armature to perform a protective function in sole response to the magnetic flux in said core, an energizing winding on said core connected to be energized by said current transformer to produce a magneto-motive force in the core which increases the relay operation effect of the magnetic flux in said core as the current in the protected circuit increases, and a control winding on said core connected to be energized by said voltage transformer to control the degree of core saturation and thereby increase the relay operating effect of said magnetomotive force as the voltage of the protected circuit decreases, said relay contact system being so set that over its normal working range the transductor core is so strongly saturated by said control winding that at the threshold of relay operation the core is magnetized beyond the knee of the magnetization curve of the core material.

According to yet another aspect of the invention an electrical protective relay system of the kind utilising the saturation characteristics of a transductor device to obtain an impedance-type characteristic comprises, in combination, a protected alternating current circuit, a voltage transformer connected to be energized by said circuit, a current transformer connected to be energized by said circuit, a transductor device having a saturable core including an armature and having a closed flux path and a further flux path including an air gap bridgable by said armature and at least some parts of said closed flux path, a relay contact system operated by said armature to perform a protective function in sole response to the magnetic flux in said core, an energizing winding on said core arranged to energize said further flux path and connected to be energized by said current transformer to produce a magneto-motive force in the core which increases the relay operating effect of the magnetic flux in said core as the current in the protected circuit increases, and a control winding on said core arranged to energize said closed flux path and connected to be energized by said voltage transformer to control the degree of core saturation and thereby increase the relay operating effect of said magnetomotive force as the voltage of the protected circuit decreases, said relay contact system being so set that over its normal working range the transductor core is so strongly saturated by said control winding that at the threshold of relay operation the core is magnetized beyond the knee of the magnetization curve of the core material. To provide slight variance by which the operating characteristic in the relay may have one of a number of forms other features of the invention provide that the armature should be in a part of the core closely adjacent said energizing winding or alternatively in a part of the core remote from said energizing winding; also, that this winding should in some constructions surround the control winding and the closed flux path of the core.

The invention will now be described with reference to the accompanying drawings, in which:

Fig. 1 shows a device which may be used in carrying out the invention,

Fig. 2 shows a magnetization curve of a typical core material and the corresponding differential permeability versus magnetizing field relationship, Fig. 3 shows a protective relay system embodying the invention, Fig. 4 shows typical operating characteristics of an impedance relay utilizing a device embodying the invention, and Fig. 5 shows a polar graph which illustrates the characteristics of the relay when the control winding is energized by alternating current having any phase relationship with respect to the magnetizing current.

Figure 1:
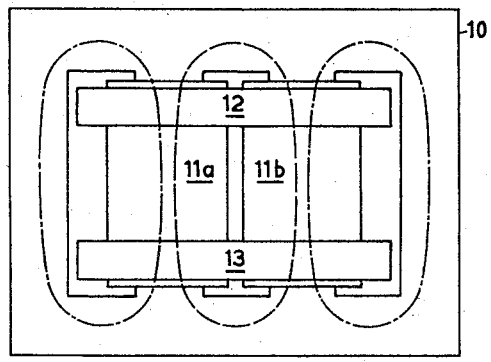

In Fig. 1 a control device in the form of a saturating transformer is shown. It comprises a laminated core 10 which has a four-limbed construction as shown. Two coils 11a and 11b are mounted on the inner limbs of the core 10, one coil being on each limb. These coils are connected in series to form a control winding 11 which, when energized, produces a magnetic flux around a path which includes the two inner limbs of the core. The broken lines in Fig. 1 illustrate this path. A coil 12, which forms a magnetizing winding embraces both of the inner limbs of the core and, when energized, produces a magnetic flux around two different paths which each include an inner limb and an outer limb of the core. These paths are shown by the chain-dotted lines in Fig. 1. An output winding 13 is arranged in a somewhat similar position to the coil 12 but is spaced apart from the coil 12. This winding 13 embraces the paths indicated by the chain-dotted lines in Fig. 1 but there is no effective linkage of this winding by the path indicated by the broken line in Fig. 1.

In operation, when the saturating transformer shown in Fig. 1 is energized by a very strong current in the winding 11 the inductive coupling between the coil 12 and the winding 13 is weakened, owing to magnetic leakage. This leakage can be adjusted by adjusting the energization of the winding 11. As a current carried by the winding 11 is increased, the inductive coupling between the coil 12 and the winding 13 is reduced and the voltage induced in the winding 13 becomes proportional to the self induced back E.M.F. in the coil 12 and approximately inversely proportional to the current in the winding 11. To ensure that the transformer operates in this way the current carried by the winding 11 must vary over a working range which is sufficiently high. It is convenient to distinguish the construction of a saturating transformer having the form shown in Fig. 1 from a transformer of four limb construction based upon conventional principles. In such a transformer the strong saturating magnetic field would be applied to magnetize the core 10 around a rectangular path which would not include the two inner limbs. The primary and secondary windings, would, in effect, become the coils 11a and 11b respectively in the construction shown in Fig. 1. An adjustment of the magnetic coupling between the two coils 11a and 11b is then readily achieved by promoting saturation in the yoke portions of the core 10 bridging the two inner limbs. The distinction may then be drawn by considering the quantitative aspects of the magnetic circuitry involved. If the permeability of the unsaturated core is 1,000 the magnetic coupling between the coils 11a and 11b can be substantially reduced by promoting a saturation of the yoke portion of the core 10 to such an extent that the differential permeability of this yoke portion is reduced to 100. For a core having the dimensions shown in Fig. 1 this would perhaps have the magnetic coupling between the coils 11a and 11b. On the other hand, with a system embodying the invention and having the actual form already described with reference to Fig. 1 the coupling between the coil 12 and the winding 13 is good until the inner limbs of the core 10 are sufficiently magnetized to cause a substantial leakage flux to bridge the gaps between the inner limbs and the outer limbs. To correspond with the quantitative example given above, that is to halve the coupling between the coil 12 and the winding 13, it would seem that the differential permeability of the inner limbs of the core must be reduced below a value of the order of 10. It is to be noted that the air gaps between the coil 12 and the winding 13 and between the outer limbs and the inner limbs have a relatively greater width and a relatively shorter length than a parallel path around the core. The permeability within the air gaps is unity and therefore for as much flux to traverse the air gaps as passes around the parallel paths in the core the effective permeability of the core must be reduced to a value which, though somewhat greater, is not very much greater than unity. Thus, for a saturating transformer embodying the invention to function as such the core must be magnetized sufficiently to reduce its permeability to a very low value. If the core is composed of a typical low loss silicon steel the magnetizing field necessary to achieve this result will be of the order of 100 oersted or more. This is a field strength which is appreciably greater than that required in transformers of conventional construction.

A disadvantage present in a saturating transformer embodying the invention is that many more ampere turns are required to perform a control function than are necessary in a conventional saturating transformer. However, an advantage which can be realised arises from the shape of the operating characteristic of a transformer having the form shown in Fig. 1. This will be best understood by reference to Fig. 2.

Figure 2:
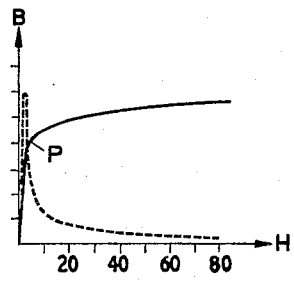

In Fig. 2 a typical relationship between the flux density B and the magnetizing field strength H applicable to a low loss electrical sheet silicon steel is shown. It is represented by the full line in the graph. This line is commonly referred to as the magnetization curve of the material and it is well known that it exhibits a "knee." The "knee" of the magnetization curve shown in Fig. 2 may be said to be at P. As the magnetizing field strength H is increased beyond the knee of the magnetization curve B increases but to a smaller and smaller extent until, when the core is saturated an increment of B becomes equal to an increment of H. The broken curve in Fig. 2 illustrates the variation of the differential permeability $$\frac{dB}{dH}$$

corresponding to the magnetization curve shown. This differential permeability passes through a maximum at a comparatively low value of H and then decreases as H increases. The variation of the differential permeability with respect to H has, when the knee of the magnetization curve has been passed, a form which resembles a rectangular hyperbola.

Thus considering the core of the transformer shown in Fig. 1 to have the magnetic properties represented in Fig. 2, and assuming that an alternating field is established by a current flowing in the coil 12, this field being very much weaker than the field set up by the winding 11, the effective permeability of the inner limbs of the core may be regarded as having the form represented by the broken curve in Fig. 2. This curve shows that as the control current supplied to the winding 11 is increased to promote a high degree of saturation in the inner limbs of the core the effective permeability of these limbs, which determines the magnetic coupling between the coil 12 and the winding 13, will be reduced. The magnetic coupling between the coil 12 and the winding 13 does not bear any definite relationship to the permeability of the core linking the coil and the winding but, generally speaking, the coupling may be regarded as inversely proportional to the sum of a constant plus the reciprocal of this permeability. Since, as Fig. 2 shows, the reciprocal of the permeability is somewhat proportional to the field strength produced by the control winding 11 it is to be expected that the transformation ratio between the coil 12 and the winding 13 will be somewhat inversely proportional to the control current supplied to the winding 11. This suggests that the transformer shown in Fig. 1 may be embodied in an impedance relay as shown in Fig. 3.

The system shown in Fig. 3 functions to protect a power line 20 in the event of the impedance of a line falling below a certain predetermined value. The unit 21 indicated by the broken rectangle represents a saturating transformer having the form shown in Fig. 1. The windings 22, 23 and 24 correspond respectively to the magnetizing winding formed by the coil 12, the output winding formed by the winding 13, and the control winding formed by the coils 11a and 11b. A resistor 25 is connected in parallel with the winding 22 and this parallel combination is supplied from a current transformer 26 with a current proportional to the current in the line 20. The control winding 24 is energized in proportion to the voltage of the line 20 and for this purpose a voltage transformer 27 energized by the line 20 is arranged to supply a D.C. current to the winding 24 through the rectifier 28 and a resistor capacitor smoothing unit 31. The output winding 23 is connected to a solenoid 29 which operates the armature of a contact system 30. This contact system 30 is arranged to supply a tripping current to a circuit breaker (not shown) connected in the line 20. The system operates in such a way that when a sufficient current is supplied to the solenoid 29 the circuit breaker is tripped and the line 20 is disconnected from its load.

In operation the output signal supplied by the winding 23 is proportional to the voltage applied to the winding 22 and is also proportional to the transformation ratio between the two windings. The voltage supplied to the winding 22 is proportional to the current of the line 20 and the transformation ratio is inversely proportional to the signal applied to the control winding 24, which is proportional to the voltage of the line 20. The net result is that the output signal supplied to the solenoid 29 is proportional to the line current and inversely proportional to the line voltage which means that it is inversely proportional to the line impedance. Thus, when the line impedance falls below a predetermined value current in excess of a predetermined amount would pass through the solenoid 29 and cause the circuit breaker to trip and so perform a protective function.

Figure 3:
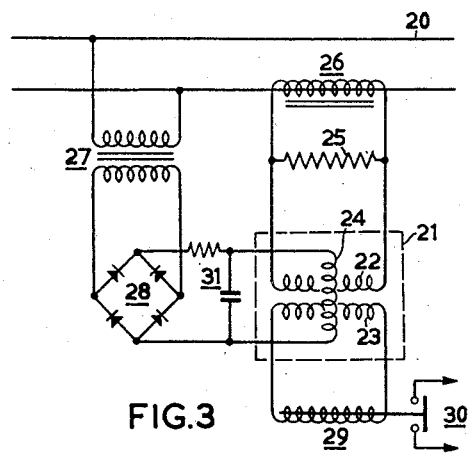
Figure 4:
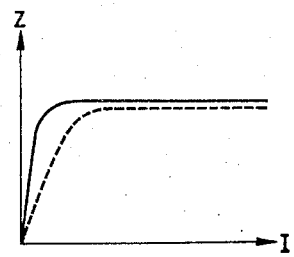
Figure 5:
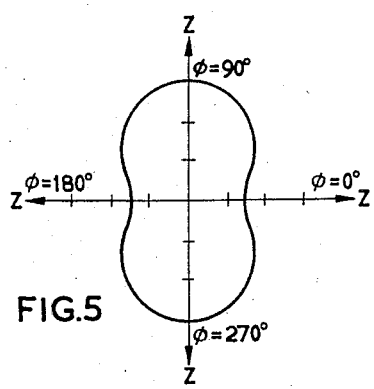

In view of the explanation already afforded for the inverse operating characteristic of the transformer shown in Fig. 1 it is only to be expected that the operating characteristic of a relay system having the form shown in Fig. 3 would not be an exactly inverse one but only approximately inverse. A surprising result which was obtained when a system was tested, however, showed that the operating characteristic obtained by using a saturating transformer having the form shown in Fig. 1 was very much better than could be expected from predictions based on the BH relationship in Fig. 2. Such an operating characteristic is reproduced in Fig. 4 where Z represents the line impedance at which the relay system operates and I represents the line current. The results represented by the full line in Fig. 4 apply where D.C. is used to energize the control winding of the saturating transformer. It has, however, also been found that if the rectifier 28 and the resistor capacitor smoothing unit 31 shown in Fig. 3 are removed and the control winding 24 is energized by alternating current, the operating characteristic of the relay system is only slightly altered as shown by the broken line in Fig. 4. Both the A.C. and D.C. operating characteristics are surprisingly good. The A.C. characteristic is based upon an in-phase relationship between the line current and the line voltage In Fig. 5 the polar diagram representing the operating impedance for varying phase angle between the line voltage and line current is shown.

It would appear that by using a magnetically saturable control device which is arranged to perform its control function by working over a range of core magnetization which lies wholly above the knee of the magnetization curve of the core material it is possible to utilize an inverse relationship between inductance, or a magnetic coupling, and a control current. Furthermore it would appear that in certain circumstances a much better inverse relationship can be obtained than might at first appear from an analysis of the actual magnetic characteristics of the core material. The control device need not have the form of a saturating transformer. This will be understood by considering a modification of the control system shown in Fig. 3. In this system the control device only serves an intermediate function by responding to input quantities to produce a suitable energizing signal for a coil-operated contact system. There are two magnetic systems, one associated with the control device and the other associated with the coil-operated contact system. In one of its aspects the invention may be applied to produce a relay system which will perform the functions of that described with reference to Fig. 3 but which combines the magnetic core system of the unit 21 and the solenoid 29. This will be understood by considering with reference to Fig. 6 the schematic modification of the saturating transformer shown in Fig. 1.

Figure 6:
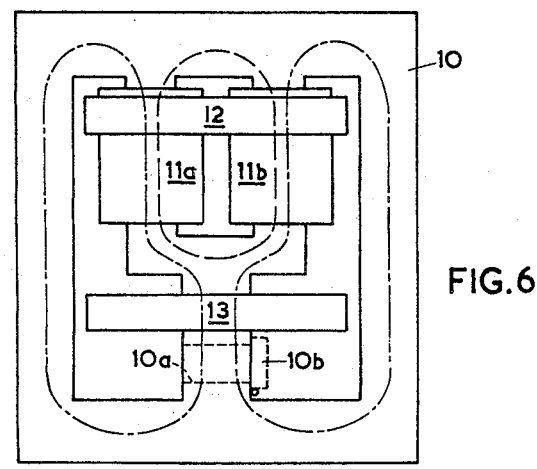
Fig. 6 illustrates a schematic modification of the device shown in Fig. 1.

In Fig. 6 the saturating transformer shown in Fig. 1 is modified by arranging the core 10 so that the winding 13 can be situated in such a position on the core that not only is there no effective linkage of the winding 13 by the magnetic flux component produced by the winding 11 but there is no actual linkage by this flux. In this case the winding 13 only embraces a flux component which is effective in inducing the output signal from the transformer. In the system shown in Fig. 3 the transformer forms the unit 21 and this output signal is supplied directly to the solenoid 29 to produce a magnetic flux in the magnetic circuit of the solenoid which is proportional to the induced e.m.f. in the output winding of the transformer. It is, therefore, possible to modify the system shown in Fig. 1 by omitting the winding 13 and introducing an air gap into that part of the core which is embraced by the winding 13 and utilizing an armature to bridge this gap. In Fig. 6 the air gap and armature are shown by the broken lines and are denoted 10a and 10b respectively.

Figure 7:
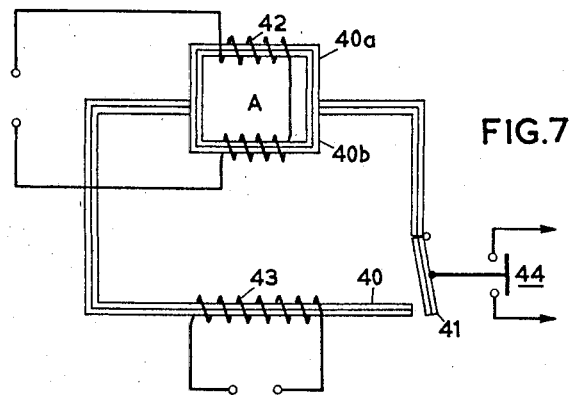
Fig. 7 illustrates a schematic modification of the device shown in Fig. 6.

In the case of the modification shown in Fig. 6 it is preferred to utilize a magnetic circuit having the form shown in Fig. 7. This circuit is formed by a core 40 which is shown to have a hinged armature 41. A part of the magnetic circuit 40 is split at A. Here it is divided into two portions 40a and 40b. A winding 42 embraces the portions 40a and 40b and is arranged so that when it carries current a locally-circulating flux component is established in the magnetic core, this flux component circulating around the two portions 40a and 40b. Thus no flux due to current in the winding 42 passes across the air gap between the armature 41 and the core 40. A further winding 43 embraces a part of the core 40 and is arranged to produce flux between the armature 41 and the core 40. The armature 41 operates a contact system 44. Biasing means, not shown, are provided to bias the armature 41 against the closure of the magnetic circuit. Thus, a particular value of flux must be established across the air gap between the armature 41 and the core 40 before the contacts of the system 44 close. This flux is provided by a current in the winding 43. The relationship between the current in the winding 43 and the flux produced in the core 40 is determined by the reluctance of the magnetic circuit and the reluctance may be controlled by adjusting the degree of saturation of the portions 40a and 40b of the core. The current in the winding 42 determines this degree of saturation. If this current increases then a greater current in the winding 43 is required to operate the relay. From this it will be clear that with a careful design of the system a relay is provided which has an impedance characteristic. By applying two currents to the two windings which are respectively proportional to the voltage and current of a protected line the system will function in the manner similar to that of the system shown in Fig. 3. It is not necessary for the current in the winding 42 to be D.C. A general impedance characteristic is obtainable with either A.C. or D.C. on either of the two windings 42 and 43.

The applications of this aspect of the invention are not restricted to relays having impedance characteristics. For example, the relay illustrated in Fig. 7 may be used in conjunction with a capacitor-resistor circuit to obtain a constant time delay relay. To understand this, consider the winding 42 to be supplied from a source of variable voltage. Then, if the winding 43 is supplied from the same voltage source through a capacitor-resistor circuit, the relay will not operate until currents having a predetermined ratio flow in the windings 42 and 43 respectively. This ratio is independent of the applied voltage but is dependent upon the time constant of the resistor-capacitor circuit.

A hinged armature relay embodying the invention in a preferred form will now be described with reference to Fig. 8. A front elevation view of the relay is shown in Fig. 8A and in Fig. 8B a cross sectional end view of the energizing system of the relay taken along the section line II—II is shown. The relay comprises a contact block 50 on which are mounted two contact strips 51 and 52. The contact block 50 is mounted on an L-shaped attachment 53a to a magnetic yoke member 53. A non-magnetic support piece 54 is attached to the member 53 and gives to the combination a U-shaped appearance. An assembly 55 of laminations having the form of a picture-frame is attached to the ends of the U of this combination, the plane of the U being perpendicular to the plane of the picture-frame. Two coils 56 and 57 are wound respectively around the two free opposite sides of the picture-frame-form of assembly 55. These coils 56 and 57 are connected in series to produce a flux which circulates around the picture-frame. Also, surrounding the whole assembly 55 there is a winding 58 which produces a flux which travels through the picture-frame and around the yoke member 53. Since the support member 54 is non-magnetic, the magnetic circuit, of which the member 53 forms a part, has free ends adjacent the ends of the support member 54. A hinged armature 59 is arranged to hinge about the free magnetic end of the member 53. This armature 59 forms a yoke which bridges the free ends of the magnetic circuit when sufficient current flows in the winding 58 to produce a flux which can overcome a spring bias inherent in the hinged mounting of the armature. The position which the armature 59 can adopt in the absence of energization of the relay is limited by a structure 60 attached to the member 53. An arm 61 attached to the armature 59 is arranged to move the contact 52 into engagement with the contact 51 when the armature closes the magnetic circuit.

Figure 8:
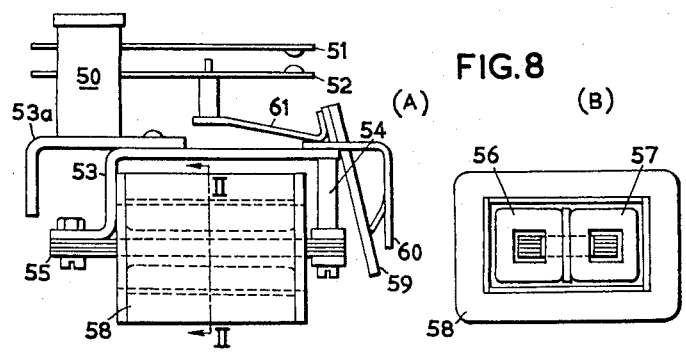
Fig. 8 illustrates a hinged armature relay having a magnetic circuit as represented by Fig. 7.

The system shown in Fig. 7 is electrically equivalent to the relay shown in Fig. 8 and, therefore, the operation of the relay will be understood from the description of the operation of the system shown in Fig. 7.

Figure 9:
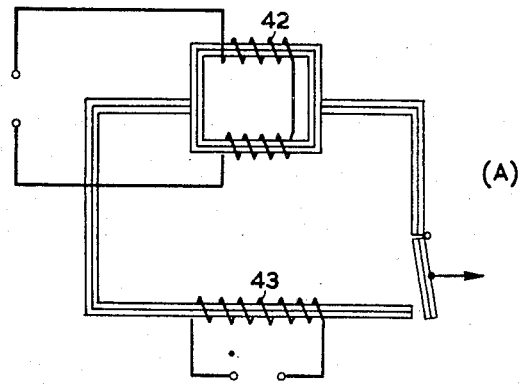
Fig. 9 illustrates schematically various winding arrangements utilizing a magnetic circuit as represented schematically by Fig. 7.
Figure 9:
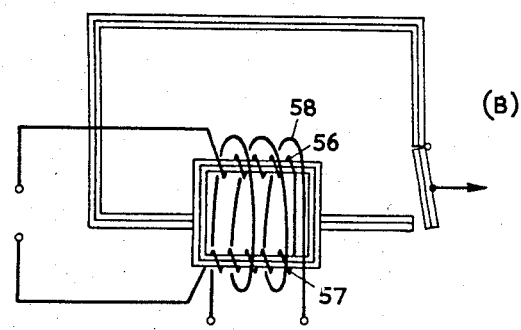

By a suitable modification of the design of the relay it is possible to adjust the operating characteristic. One way in which this may be done is to design different relays to have different leakage effects between the operating and biasing windings. For the purpose of the following description "biasing winding" will be used to denote a winding such as the winding 42 in Fig. 7 which produces a biasing field, and "operating winding" will be used to denote a winding corresponding to the winding 43 in Fig. 7. In Fig. 9A an illustration of the magnetic circuit of the system shown in Fig. 7 is presented. It will be noted that the operating winding 43 is arranged on the limb associated with the armature air gap, whereas the biasing winding 42 is wound on the limb associated with the armature hinge. In such an arrangement there is a considerable leakage between the two windings. This is obviated with the system shown in Fig. 8 since here the operating winding 58 and the biasing windings 56 and 57 embrace the same limb. This is illustrated schematically in Fig. 9B. Another arrangement is shown in Fig. 9C in which the operating winding 63 is wound on the limb associated with the armature hinge and the biasing winding 64 is wound on the limb associated with the armature air gap.

Figure 10:
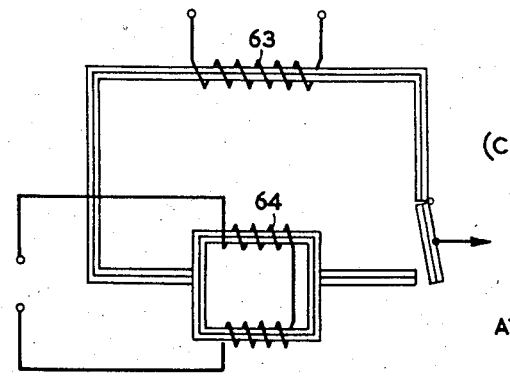
Fig. 10 illustrates operating characteristics appropriate to the various winding arrangements shown in Fig. 9.
Figure 10:
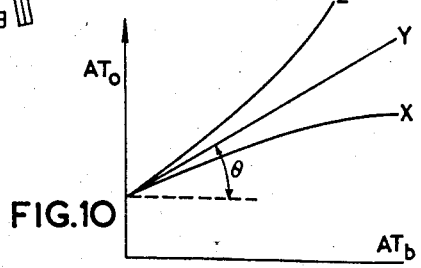

The above-mentioned alternative winding arrangements give relay characteristics of the form shown in Fig. 10. In Fig. 10 operating characteristics relating to operating ampere turns $AT_o$ and biasing ampere turns $AT_b$ are shown. The curve X corresponds to the system shown in Fig. 9A, curve Y corresponds to the system shown in Fig. 9B and the curve Z corresponds to the system shown in Fig. 9C. This shows that by adjusting the leakage between the operating and biasing windings the relay characteristic can be modified over a range.

It is also possible to modify the angle of the characteristic (angle θ shown in Fig. 10) by introducing additional coils on the biasing limb and connecting these coils in series with the operating winding.

The various relay characteristics which are possible by designing the winding system in a variety of ways is of advantage since different characteristics are desirable in particular applications.

In order to secure operating characteristics having the form shown in Fig. 10 it is necessary for the material forming the core of the control device to work over a range which lies above the knee of the magnetization curve of the core material. The linear relationship between the values at $AT_o$ and $AT_b$ obtainable with the system shown in Fig. 9B corresponds to the constant operating impedance characteristic of the relay. As in the system already described with reference to Fig. 8 this impedance characteristic has been found to be rather better than might at first appear from an analysis of the actual magnetic characteristics of the core material. This is believed to be due to the different directions of the magnetizing field produced by the magnetizing winding and the control winding in certain parts of the core. This does not apply in the system shown in Figs. 9A and 9C and it is no doubt for this reason that the curves X and Z in Fig. 10 are not linear.

What I claim as my invention and desire to secure by Letters Patent is:

1. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a transductor device having a saturable core, a relay contact system including means for operating it to perform a protective function in sole response to the magnetic flux in said core, an energizing winding on said core connected to be energized by said current transformer to produce a magneto-motive force in the core which increases the relay operating effect of the magnetic flux in said core as the current in the protected circuit increases, and a control winding on said core connected to be energized by said voltage transformer to control the degree of core saturation and thereby increase the relay operating effect of said magneto-motive force as the voltage of the protected circuit decreases, said relay contact system being so set that over its normal working range the transductor core is so strongly saturated by said control winding that at the threshold of relay operation the core is magnetized beyond the knee of the magnetization curve of the core material.

2. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a saturable transformer having a saturable core, a secondary winding on said core, a coil-operated relay contact system connected to be energized by an output signal supplied by said secondary winding and connected in said circuit to perform a protective function when operated, a primary energizing winding on said core connected to be energized by said current transformer to produce a magneto-motive force in the core which increases the output signal from the secondary winding as the current in the protected circuit increases, and a control winding on said core connected to be energized by said voltage transformer to control the degree of core saturation and thereby increase the output signal from the secondary winding as the voltage of the protected circuit decreases, said relay contact system being so set that over its normal working range the transductor core is so strongly saturated by said control winding that at the threshold of relay operation the core is magnetized beyond the knee of the magnetization curve of the core material.

3. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a saturable transformer having a saturable core, a secondary winding on said core, a coil-operated relay contact system connected to be energized by an output signal supplied by said secondary winding and connected in said circuit to perform a protective function when operated, a primary energizing winding on said core loosely-coupled magnetically with said secondary winding and connected to be energized by said current transformer to have a potential drop proportional to the current in said alternating current circuit to induce a rate of flux change in the part of the core embraced by the primary winding which increases the output signal from the secondary winding as the current in the protected circuit increases, and a control winding on said core connected to be energized by said voltage transformer to control the degree of core saturation and thereby strengthen the magnetic coupling between the primary and secondary windings, and increase the output signal from the secondary winding and so enhance the relay operating effect as the voltage of the protected circuit decreases, said relay contact system being so set that over its normal working range the transductor core is so strongly saturated by said control winding that at the threshold of relay operation the core is magnetized beyond the knee of the magnetization curve of the core material.

4. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a saturable transformer having a four-limbed saturable magnetic core comprising two independent flux paths, each including an outer and an inner limb, and a single flux path including the centre two limbs of the core, a secondary winding on said core connected to be energized by the combined flux in both independent flux paths, a coil-operated relay contact system connected to be energized by an output signal supplied by said secondary winding and connected in said circuit to perform a protective function when operated, a primary energizing winding on said core magnetically coupled to the secondary winding and connected to be energized by said current transformer to produce a magnetic effect around said two independent flux paths in the core and thereby increase the output signal from the secondary winding and so enhance the relay operating effect as the current in the protected circuit increases, and a control winding on the centre two limbs of said core connected to be energized by said voltage transformer to control the degree of core saturation around said single flux path and thereby increase the relay operating effect of said output signal from the secondary winding as the voltage of the protected circuit decreases, said relay contact system being so set that over its normal working range the transductor core is so strongly saturated by said control winding that at the threshold of relay operation the core is magnetized beyond the knee of the magnetization curve of the core material.

5. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a transductor device having a saturable core including an armature, a relay contact system operated by said armature to perform a protective function in sole response to the magnetic flux in said core, an energizing winding on said core connected to be energized by said current transformer to produce a magneto-motive force in the core which increases the relay operating effect of the magnetic flux in said core as the current in the protected circuit increases, and a control winding on said core connected to be energized by said voltage transformer to control the degree of core saturation and thereby increase the relay operating effect of said magneto-motive force as the voltage of the protected circuit decreases, said relay contact system being so set that over its normal working range the transductor core is so strongly saturated by said control winding that at the threshold of relay operation the core is magnetized beyond the knee of the magnetization curve of the core material.

6. An electrical protective relay system of the kind utilising the saturation characteristics of a transductor device to obtain an impedance-type characteristic and comprising, in combination, a protected alternating current circuit, a voltage transformer connected to be energized by said circuit, a current transformer connected to be energized by said circuit, a transductor device having a saturable core including an armature and having a closed flux path and a further flux path including an air gap bridgable by said armature and at least some parts of said closed flux path, a relay contact system operated by said armature to perform a protective function in sole response to the magnetic flux in said core, an energizing winding on said core arranged to energize said further flux path and connected to be energized by said current transformer to produce a magneto-motive force in the core which increases the relay operating effect of the magnetic flux in said core as the current in the protected circuit increases, and a control winding on said core arranged to energize said closed flux path and connected to be energized by said voltage transformer to control the degree of core saturation and thereby increase the relay operating effect of said magneto-motive force as the voltage of the protected circuit decreases, said relay contact system being so set that over its normal working range the transductor core is so strongly saturated by said control winding that at the threshold of relay operation the core is magnetized beyond the knee of the magnetization curve of the core material.

7. An electrical protective relay system according to claim 6, wherein said armature is in a part of the core closely adjacent said energizing winding.

8. An electrical protective relay system according to claim 6, wherein said armature is in a part of the core remote from said energizing winding.

9. An electrical protective relay system according to claim 6, wherein the energizing winding surrounds the control winding and said closed flux path of the core.

References Cited in the file of this patent

UNITED STATES PATENTS

| | | |
|---|---|---|
| 2,545,995 | Goldsborough | Mar. 20, 1951 |
| 2,573,249 | Dahlgren | Oct. 30, 1951 |
| 2,594,022 | Horton | Apr. 22, 1952 |

FOREIGN PATENTS

| | | |
|---|---|---|
| 688,395 | Great Britain | Mar. 4, 1953 |
| 1,037,874 | France | Sept. 23, 1953 |